United States Patent [19]

Flood et al.

[11] Patent Number: 5,618,870
[45] Date of Patent: Apr. 8, 1997

[54] POLYKETONE POLYMER BLEND

[75] Inventors: John E. Flood; John W. Kelley; Davis R. Roane, all of Houston; John M. Clasby, Sugar Land, all of Tex.

[73] Assignee: Shell Oil Company, Houston, Tex.

[21] Appl. No.: 409,623

[22] Filed: Mar. 23, 1995

Related U.S. Application Data

[63] Continuation of Ser. No. 214,873, Mar. 16, 1994, abandoned.

[51] Int. Cl.⁶ .......................... C08K 5/24; C08F 283/12
[52] U.S. Cl. ..................... 524/269; 525/471; 525/479
[58] Field of Search ........................... 524/269; 525/471, 525/479

[56] References Cited

U.S. PATENT DOCUMENTS

| | | | |
|---|---|---|---|
| 3,932,610 | 1/1976 | Rudy et al. | 424/70 |
| 4,075,362 | 2/1978 | Concannon | 427/22 |
| 4,386,135 | 5/1983 | Campbell et al. | 428/447 |
| 4,431,452 | 2/1984 | Comper et al. | 106/38.22 |
| 4,469,826 | 9/1984 | Carlick et al. | 523/339 |
| 4,843,144 | 6/1989 | Van Broekhoven et al. | 528/392 |
| 4,870,133 | 9/1989 | Lutz et al. | 525/185 |
| 4,880,863 | 11/1989 | Lutz et al. | 524/377 |
| 4,880,900 | 11/1989 | Van Doorn et al. | 528/392 |
| 4,936,917 | 6/1990 | Harakal et al. | 106/38.22 |
| 5,186,972 | 2/1993 | Williams et al. | 427/2 |
| 5,332,792 | 7/1994 | Jablon | 525/539 |

OTHER PUBLICATIONS

J. Burkhardt "Silicones:Chemistry and Technology" Vulkan–Verlag Essen, Germany (1991), pp. 28–31.

*Primary Examiner*—George F. Lesmes
*Assistant Examiner*—Helen F. Lee

[57] ABSTRACT

It is herein disclosed a polymer blend having and exhibiting excellent tribological properties comprising a major amount of polyketone polymers and a minor amount of one or more silicone oil. The blend also has and exhibits improved lubricity and has a low DCOF of from about 0.3–0.4. The blend is particularly useful in the manufacture of articles used in applications where surfaces are in contact during motion.

5 Claims, No Drawings

POLYKETONE POLYMER BLEND

This is a continuation of application Ser. No. 08/214,873, filed Mar. 16, 1994, now abandoned.

FIELD OF THE INVENTION

This invention generally relates to polyketone polymers. More particularly, the invention relates to a blend of polyketone polymers and silicone oils. The blend has improved tribological properties and are particularly useful in applications where surfaces are in contact with relative motion.

BACKGROUND OF THE INVENTION

Polymers of carbon monoxide and olefins, generally referred to as polyketones, are well known in the art. The polyketone polymers of this invention are of a specific alternating type. Such polymers have utility as premium thermoplastics in the manufacture of a wide variety of articles.

While these polyketone polymers are preferred in some applications, they are sometimes not preferred in others; for example, in applications which require good tribological properties. Examples of such applications include gears, belt chains, plane and roller bearings, linear bearings, sleeve bearings, pulleys, and sliding plates.

Typically polyacetal and Nylon 66 modified with external lubricants are used in such applications. It is believed that the relative poor performance of polyketone polymers in comparison to polyacetal may be due to their high dynamic coefficient of friction (DCOF). As an illustration, while polyacetal has a DCOF of from 0.3–0.4 units, polyketone polymers have a DCOF of from 0.7–0.9 units.

It is known that the use of agents such as processing aids and lubricants aids the lubricity of non-polyketone type polymers. The present invention aims at lowering DCOF of polyketone polymers by blending with such agents.

SUMMARY OF THE INVENTION

It is a general object of this invention to improve the lubricity of polyketone polymers by lowering its DCOF.

Accordingly, it now provided a blend having a lower DCOF comprising a major amount of polyketone polymers and a minor amount of silicone oil. The inventive blend has and exhibits improved tribological properties.

DETAILED DESCRIPTION OF THE INVENTION

The following terms when and as used in this specification shall have the following meaning:

DCOF:
During relative motion of two surfaces in contact the DCOF is the ratio of the resulting frictional force to the applied normal force while holding the relative surface velocity constant over time.

LPV (Limiting pressure velocity):
While holding the relative surface velocity constant between two specimens in contact and increasing the applied normal force in a stepwise manner in time, the LPV is the multiplicative product of the normal pressure and surface velocity at the step just prior to catastrophic material failure due to thermal softening.

Generally speaking, the materials useful in the practice of this invention include a linear alternating polymer of carbon monoxide and at least one ethylenically unsaturated hydrocarbon (sometimes simply referred to as a polyketone polymer), suitable silicone oils, and other common polymer additives. For instance, fillers, extenders, other lubricants, pigments, plasticizers, and other polymeric materials can be added to the compositions to improve or otherwise alter the properties of the composition. In general, the practice of this invention involves suitably contacting sufficient quantities of the useful material to form the inventive blend.

The polyketone polymers which are employed as the major component of the oxidatively stabilized polymer composition of the invention are of a linear alternating structure and contain substantially one molecule of carbon monoxide for each molecule of ethylenically unsaturated hydrocarbon. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

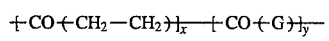

where G is the moiety of ethylenically unsaturated hydrocarbon of at least three carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the $-[CO-(CH_2-CH_2)]-$ units and the $-CO-(G)-$ units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer of a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, of from about 0.5 dl/g to about 10 dl/g, more frequently of from about 0.8 dl/g to about 4 dl/g.

A preferred method for the production of the polyketone polymers is illustrated by U.S. Pat. No. 4,843,144 which is herein incorporated by reference.

The useful silicone oils can be described as linear chains of polydimethyl siloxane with viscosities ranging from about 1,000–300,000 centistokes. Silicone oils with high viscosities of from about 100,000 centistokes are preferred. Typically, silicone oil(s) are present in the blend in an amount of from about 0.1–5 wt %, and preferably from about 2–4 wt %.

The method of producing the inventive polymer blend is not material so long as a relatively uniform distribution of the components is obtained. Generally speaking, any conventional or known method for producing blends is considered suitable. In one embodiment silicone oil is dry blended with polyketone polymer and metered upstream along with polyketone pellets into a twin screw extruder/single screw extruder. The silicone oil can also be metered down-stream into a twin screw extruder while the polyketone polymer is metered upstream. Alternatively, a dry blend of polyketone polymer pellets, and silicone oil can be metered up-stream into a twin or single screw extruder.

The inventive blend can be processed by conventional methods such as extrusion and injection molding into various articles of manufacture which are particularly useful in applications requiring good tribological properties.

The invention is further illustrated by the following non-limiting examples and the experimental results as shown in Tables 1 and 2.

Examples 2 and 4

Examples 2 and 3 are polyketones with 0.5–2 wt % silicone oil with a viscosity of 60,000 centistokes. None of these examples exhibited a low DCOF. Example 4 exhibited a high LPV compared to Example 1. Examples 2 and 3 have LPV values equal to that Example of 1.

Examples 5

Example 5 is polyketone polymer with 2 wt % silicone oil where the silicone oil viscosity was 30,000 centistokes. Like in examples 2–4 in comparison to the neat polymer (Example 1), there were no improvements in DCOF and LPV.

Examples 6–7

Examples 6 and 7 contain 1 and 2 wt % (100,000 cs viscosity) silicon oil respectively. There is observed a slight decrease in DCOF and an increase in LPV compared to the neat polymer. These improvements are believed to be due to the increased lubrication from the higher viscosity silicone oil.

TABLE 1

Tribological properties and mechanical properties of polyketone/silicone oil blends.

| Ex. | Silicone oil (wt %) | Silicone oil Viscosity (cs) | Final Dynamic COF | Limiting PV psi × ft/min @ 100 fpm | 1% sec Flex. Mod. (kpsi) | Stress @ Yield (psi) | Elong. @ Yield (%) | Izod @ RT (ft lb) |
|---|---|---|---|---|---|---|---|---|
| 1 | 0 | — | 0.86 (0.12) | 31500 (3800) | — | 8500 | 35 | 4.1 (0.16) |
| 2 | 0.5 | 60000 | 0.75 (0.13) | 28300 (2900) | — | 8500 (40) | 35 (1) | 4.4 (0.1) |
| 3 | 1.0 | 60000 | 0.84 (0.10) | 31700 (5800) | — | 8500 (97) | 35 (0.5) | 3.7 (0.1) |
| 4 | 2.0 | 60000 | 0.88 (0.03) | 46700 (7200) | — | 8100 (50) | 36 (0.5) | 3.7 (0.1) |
| 5 | 2.0 | 30000 | 0.9 (0.07) | 35500 (1300) | — | 8200 (96) | 36 (0.8) | 3.40 (0.2) |
| 6 | 1.0 | 100000 | 0.73 (0.09) | 38300 (2900) | — | 8400 (96) | 46 (0) | 6.3 (0.5) |
| 7 | 2.0 | 100000 | 0.68 (0.3) | 36700 (2900) | — | 8100 (180) | 47 (0) | 5.6 (0.8) |
| 8 | 4.0 | 100000 | 0.41 (0.21) | 46700 (10,000) | — | 7900 (73) | 48 (0) | 5.2 (0.3) |
| 9 | 2.0 | 100000 | 0.45 (0.27) | 31700 (5800) | — | 7700 (70) | 43 (0.4) | 4.7 (0.3) |
| 10 | 2.0 | 30000 | — | — | 260 (1.8) | 8300 (87) | 43 (0.5) | 3.85 (0.2) |
| 11 | 3.0 | 30000 | — | — | 251 (2.5) | 8100 (120) | 42 (0.5) | 3.7 (0.3) |
| 12 | 4.0 | 30000 | — | — | 245 (1.7) | 7900 (66) | 42 (0.4) | 3.3 (0.3) |
| 13 | 2.0 | 100000 | — | — | 258 (1.9) | 8200 (60) | 41 (0.8) | 3.9 (0.13) |
| 14 | 3.0 | 100000 | — | — | 254 (1.5) | 8100 (75) | 42 (1) | 3.8 (0.3) |
| 15 | 4.0 | 100000 | — | — | 247 (1.2) | 7800 (110) | 43 (0.4) | 3.4 (0.12) |
| 16 | 0 | — | — | — | 260 (1) | 8900 (79) | 40 (0.4) | 4.3 (0.1) |

EXAMPLES

Example 1

Example 1 in Table 1 is neat polyketone. In this example the tribological properties are considered to be intermediate to other neat engineering polymers. The limiting PV (LPV) number is acceptable, however, the dynamic coefficient of friction is high (greater than 0.8).

Example 8

Example 8 contains 4 wt % (100,000 cs viscosity) silicone oil. This example demonstrates a significant decrease in DCOF (0.41) versus the neat polymer (Example 1) and the other examples (2–7). In addition, there was observed a significant increase in the LPV (46,700) versus the neat polymer (31,500). It is believed that the higher viscosity and higher concentration of the silicone oil contributed to the improved tribological properties in this example.

Example 9

Example 9 is a repeat of Example 7 and contains 2 wt % (100,000 cs viscosity) silicone oil. In this case the DCOF was reduced significantly to 0.45. However, unlike Example 7, there was no increase in the LPV compared to the neat polymer.

Examples 10–16

These examples demonstrate that silicone oil (regardless of viscosity) decreases the flexural modulus of the polyketone polymer as the oil concentration increases. There is also a small decrease in tensile strength at yield and no significant effect on the elongation at yield as the oil concentration increases. The Notched Izod impact strength may be decreasing slightly as the oil concentration increases. Examples 10–16 were tested as a set and the mechanical properties should be considered more reliable than previous examples.

Finally, the experimental data shown in Table 2 (melt index test at 240° C.) demonstrates that silicone oil may act as a processing aid because the melt index is increasing significantly with relatively small increases in oil concentration.

TABLE 2

| Melt Index for Polyketone Polymer/Silicone Oil Blends | | |
|---|---|---|
| Example No. | Silicone Oil wt % (viscosity in centistokes) | Melt Index @ 240° C. |
| 10 | 2 (30,000) | 8.8 |
| 11 | 3 (30,000) | 9.94 |
| 12 | 4 (30,000) | 12.75 |
| 13 | 2 (100,000) | 8.6 |
| 14 | 3 (100,000) | 11.27 |
| 15 | 4 (100,000) | 14.47 |
| 16 | 0 | 7.49 |

While this invention has been described in detail for the purpose of illustration, it is not to be construed as limited thereby but is intended to cover all changes and modifications within the spirit and scope thereof.

That which is claimed is:

1. A polymer blend comprising a major amount of a linear alternating polymer of carbon monoxide and one or more ethylenically unsaturated hydrocarbon, and between about 1 and 5 wt % of a silicone oil comprised of a linear chain of polydimethyl siloxane having a viscosity grater than about 30,000 centistokes and less than about 300;000 centistokes.

2. A blend as in claim 1 having and exhibiting improvements in dynamic coefficient of friction (DCOF) and Limiting Pressure Velocity (LPV) values.

3. A polymer blend comprising a major amount of a linear alternating polymer of carbon monoxide and one or more ethylenically unsaturated hydrocarbon, and between about 1 and 5 wt % of a silicone oil comprised of a linear chain of polydimethyl siloxane having a viscosity of about 100,000 centistokes.

4. A blend as in claim 3 having and exhibiting improvements in dynamic coefficient of friction (DCOF) and Limiting Pressure Velocity (LPV) values.

5. An article of manufacture made from the blend of claim 1.

* * * * *